United States Patent
Magno et al.

(10) Patent No.: US 11,482,842 B2
(45) Date of Patent: Oct. 25, 2022

(54) SUPPORTING DEVICE FOR TOOLS FOR SWITCHGEAR AND TOOL KIT COMPRISING SAID DEVICE

(71) Applicant: ABB Schweiz AG, Baden (CH)

(72) Inventors: Giorgio Magno, Brembate di Sopra (IT); Stefano Magoni, Osio Sotto (IT)

(73) Assignee: ABB SCHWEIZ AG, Baden (CH)

( * ) Notice: Subject to any disclaimer, the term of this patent is extended or adjusted under 35 U.S.C. 154(b) by 470 days.

(21) Appl. No.: 16/500,622

(22) PCT Filed: Mar. 21, 2018

(86) PCT No.: PCT/EP2018/057121
§ 371 (c)(1),
(2) Date: Oct. 3, 2019

(87) PCT Pub. No.: WO2018/184840
PCT Pub. Date: Oct. 11, 2018

(65) Prior Publication Data
US 2021/0111543 A1 Apr. 15, 2021

(30) Foreign Application Priority Data
Apr. 3, 2017 (EP) ..................................... 17164617

(51) Int. Cl.
*B25B 11/00* (2006.01)
*H02B 3/00* (2006.01)
*H02B 11/127* (2006.01)

(52) U.S. Cl.
CPC ............. *H02B 3/00* (2013.01); *H02B 11/127* (2013.01); *B25B 11/002* (2013.01)

(58) Field of Classification Search
CPC ......... B25B 11/00; B25B 11/002; B23Q 1/00; B23Q 1/03
See application file for complete search history.

(56) References Cited

U.S. PATENT DOCUMENTS 7,108,461 B1 * 9/2006 Colburn .................. B25B 5/163
269/95
7,647,681 B1 * 1/2010 Harris ................... B25B 11/002
29/281.1

(Continued)

OTHER PUBLICATIONS

European Patent Office, International Search Report & Written Opinion issued in corresponding Application No. PCT/EP2018/057121, dated May 14, 2018, 12 pp.

(Continued)

*Primary Examiner* — Lee D Wilson
(74) *Attorney, Agent, or Firm* — Greenberg Traurig, LLP

(57) ABSTRACT

A supporting device for mounting tools on a switchgear front panel which includes a first, fixing, plate and a second, supporting, plate connected to each other and free to rotate with respect to each other in a first plane; a first locking device for locking the first, fixing, plate and the second, supporting, plate at selected angular position with respect to each other; a magnetic fixing device comprising fixing magnets adapted to be fixed on the switchgear front panel; an adjustable connection device connecting the fixing magnets to the first, fixing, plate and including a second locking device for locking the fixing magnets at different positions with respect to the first, fixing, plate; a third locking device for fixing a tool on the second, supporting, plate. A tool kit for a switchgear including a switchgear tool and a supporting device is also disclosed.

16 Claims, 10 Drawing Sheets

(56) References Cited

U.S. PATENT DOCUMENTS

| | | | |
|---|---|---|---|
| 8,164,875 B1 | 4/2012 | Ledbetter et al. | |
| 2009/0051090 A1* | 2/2009 | Barnes, Jr. ......... | B23K 37/0533 |
| | | | 269/8 |
| 2021/0111543 A1* | 4/2021 | Magno .................... | H02B 3/00 |

OTHER PUBLICATIONS

European Patent Office, Extended Search Report issued in corresponding Application No. 17164617.7, dated Sep. 20, 2017, 5 pp.

* cited by examiner

SUPPORTING DEVICE FOR TOOLS FOR SWITCHGEAR AND TOOL KIT COMPRISING SAID DEVICE

The present invention relates to a supporting device for tools for switchgears, and in particular to a supporting device for tools for Medium Voltage switchgears. Moreover, the present invention also relates to a tool kit comprising a tool for switchgears, in particular for Medium Voltage switchgears, and a supporting device for tools as described hereinafter. More in particular, the present invention relates to a tool kit comprising a motorized drive for rack-in/rack-out operations in a Medium Voltage switchgear, and a supporting device for tools as described hereinafter.

Even if in the following description reference will be primarily made to a Medium Voltage switchgear system, the device of the present invention is of more general applicability and is usable for a broader range of voltage applications.

It is known that in Medium Voltage switchgear, which are equipped with a switching apparatus such as a medium voltage circuit breaker or contactor, it is normally foreseen the possibility to move said circuit breaker or contactor from a disconnected position to test position or from test position to a service position or from disconnected position to service position, and vice-versa. To this purpose, the circuit breaker or the contactor is normally mounted on a truck that allows the movement of the switching apparatus from an inserted position to an extracted position, passing through an intermediate position, if provided (test position) and vice-versa (rack-in/rack-out operations).

Such operations usually require a person that operates the system directly, by hand, on the front panel of the switchgear. Often, particularly in case of switching apparatuses of old type, there are not clear, visible and safe contact signals about the position of the switching apparatus (test, service), and this could lead to erroneous operations by the operator. Indeed, it may happen that, in case of failure, an internal arc flash could occur with emission of high temperature gases toward the outside of the switchgear. Such event could cause a serious injury or death of people who are operating close to the switchgear.

Thus, for safety reasons, it would be desirable that the rack-in/rack-out operations—as well as other operations—are carried out in remote to avoid any risk for the operator.

In order to increase safety for people who usually operate on Medium Voltage switchgear, on the market there are systems or kits that can perform racking operation (in or/and out)—as well as other kind of operations on the switchgear—by remote command.

However, the operation parameters for, e.g., the rack-in/rack-out operations are very specific, and usually varies depending on the kind and rating of the switching apparatus (circuit breaker or contactor) as well as on the kind of switchgear in which said switching apparatus is located.

Consequently, these systems or kits are normally applicable only to a small range of combined couples switchgear/circuit breaker (or switchgear/contactor) and normally each couple has its dedicated kit. Moreover, small adaptations on the switchgear can be normally required, since, e.g., the layout of the front panel of the switchgear can be different from case to case.

In other words, since operating parameters and features—like, for example, travel distance of the circuit breaker or contactor truck, insertion stroke of the actuating shaft, layout of the front panel of the switchgear—a dedicated system is normally required for each relatively narrow range of combined couples switchgear/circuit breaker (or switchgear/contactor).

Hence, the present disclosure is aimed at providing a supporting device for a tool for switchgears, in particular a medium voltage switchgear, which allows overcoming at least some of the above-mentioned shortcomings.

In particular, the present invention is aimed at providing a supporting device for a tool for switchgears, in particular a medium voltage switchgear, which can be fixed to a switchgear without modification on it.

Furthermore, the present invention is aimed at providing a supporting device for a tool for switchgears, in particular a medium voltage switchgear, which can be fixed to many different switchgears.

In addition, the present invention is aimed at providing a supporting device for a tool for switchgears, in particular a medium voltage switchgear, which can be fixed on the front panel of a switchgear in a quick and simple manner.

Thus, in a first aspect the present invention relates to a supporting device for mounting tools on a switchgear front panel. The supporting device of the present invention is characterized in that it comprises:
- a first, fixing, plate and a second, supporting, plate connected to each other and free to rotate with respect to each other in a first plane;
- a first locking device for locking said first, fixing, plate and said second, supporting, plate at selected angular position with respect to each other;
- a magnetic fixing device comprising fixing magnets adapted to be fixed on said switchgear front panel;
- an adjustable connection device connecting said fixing magnets to said first, fixing, plate comprising a second locking device for locking said fixing magnets at different positions with respect to said first, fixing, plate;
- a third locking device for fixing a tool on said second, supporting, plate.

As better explained in the following description, thanks to the particular structure of the supporting device of the present invention the above-mentioned problems can be avoided, and the whole system is flexible, simple, and very easy to operate.

Indeed, the supporting device of the present invention can be fitted to a switchgear without modification on it. In practice, thanks to the adjustable connection devices and the possibility of locking the fixing plate and the supporting plate at different angular position with respect to each other, it is possible to fix the connection device of the present invention to the front panel of many different kinds of switchgears.

Moreover, the operation for fixing it on the front panel of the switchgear is very simple and does not require the use of any particular working tool.

Once the supporting device is positioned on the front panel of the switchgear, the desired tool (e.g. a motorized drive command for rack in/rack out operations) can be mounted on the support and connected to the switchgear. The tool then can be preferably operated from remote, thereby avoiding any risk for the operator during the operation of the tool. However, the possibility of a local mode operation can be also foreseen.

Preferably, the supporting device of the present invention comprises a first substantially circular through hole and the first, fixing, plate and second, supporting, plate are coaxially mounted around said first substantially circular through hole.

In a preferred embodiment of the supporting device of the present invention, the adjustable connection device comprises first adjustable connection elements that are connected to said first, fixing, plate and are free to slide in said first plane. The adjustable connection device also comprises second adjustable connection elements that connect said fixing magnets to a corresponding first adjustable connection element at adjustable distances along a first direction perpendicular to said first plane.

Then the second locking device preferably comprises first locking elements for locking the first adjustable connection elements at adjustable distances with respect to said first, fixing, plate and second locking elements for locking the fixing magnets at adjustable distances with respect to said corresponding first adjustable connection element.

In other words, as better explained in the detailed description, the first adjustable connection elements allow positioning the fixing magnets at suitable location on the front panel of the switchgear, while the second adjustable connection elements allow maintaining the supporting device in a vertical plane at a proper distance from the front panel of the switchgear. The first and second locking element then keep the supporting device properly fixed in the desired position on the front panel of the switchgear.

Since the second, supporting, plate is free to rotate with respect to the first, fixing, plate, it is then possible to set the former (and consequently the tool attached thereto) in a substantially horizontal alignment by rotating it with respect to the first, fixing, plate. The first locking device then can lock the second, supporting, plate at the selected angular position with respect to the first, fixing, plate so that the horizontal alignment of the supported tool can be guaranteed.

In order to check the proper horizontal alignment of the device, an alignment system, such as a level, e.g. a spirit level, can be conveniently positioned on the second, supporting plate. Preferably, the third locking device (i.e. the device aimed at locking and keeping in place the tool once positioned on the supporting device) and the fixing magnets are positioned on opposite sides of said supporting device, so as to guarantee an easy and quick positioning of the tool once the supporting device has been fixed on the front panel of the switchgear.

In a particular embodiment of the supporting device according to the invention, said first adjustable connection elements may conveniently comprise a plurality of sliding bars, a first end thereof being slidingly connected to said first, fixing, plate and a second end thereof being connected to a corresponding fixing magnet through said second adjustable connection elements.

In such a case, preferably, each of said plurality of sliding bars slide in a corresponding plurality of slots in the first, fixing, plate. Appropriate screw devices can then be used for locking said sliding bars at selected positions into said slots.

In a further particular embodiment of the supporting device according to the present invention, said second adjustable connection elements may conveniently comprise second screw devices having a first end, which is threaded into said first adjustable connection elements. The second screw devices then extend from said first adjustable connection elements perpendicularly to said first plane in the direction of the front panel of the switchgear, and the fixing magnets are positioned on the second end of said second screw devices.

In an embodiment of the supporting device of the present disclosure, said first, fixing, plate comprises a central body, which is formed around said first substantially circular through hole and a plurality of legs extending from said central body, said adjustable connection device being positioned in correspondence of said legs. For instance, a convenient number of legs can be three or four. However, a different number of legs can be used depending on the needs (e.g., layout of the front panel of the switchgear, weight of the tool to be supported, . . . ). The free-rotation coupling between the first, fixing, plate and the second, supporting, plate can be carried out in various manner.

In a preferred embodiment of the supporting device according to the present invention, the second, supporting, plate preferably comprises one or more arc-shaped slots and the first, fixing, plate comprises one or more pins which are inserted into said arc-shaped slots, thereby allowing a free rotation over a given arc of the second, supporting, plate with respect to the first, fixing, plate.

In such a case, the first locking device may conveniently comprise third screw devices for locking said pins into said arc-shaped slots and setting the first and second plates at the selected angular position between them.

In a further preferred embodiment of the present invention, the supporting device further comprises a centering device, which is adapted to align said supporting device with a tool insertion hole in said switchgear front panel.

In a further aspect, the present disclosure is aimed at providing a tool kit for a switchgear, in particular a medium voltage switchgear, which allows overcoming at least some of the above-mentioned shortcomings.

In particular, the present invention is also aimed at providing a tool kit for a switchgear, in particular a medium voltage switchgear, which comprises a switchgear tool and a supporting device as described herein.

Furthermore, the present invention is also aimed at providing a tool kit for a switchgear, in particular a medium voltage switchgear, in which the tool can be operated from remote.

In addition, the present invention is aimed at providing a tool kit for a switchgear, in particular a medium voltage switchgear, which can operate on different couples of switchgear/circuit breakers or on different couples of switchgear/contactors with different operating strokes.

Further, the present invention is also aimed at providing a tool kit for a switchgear, in particular a medium voltage switchgear, which can operate on different couples of switchgear/circuit breakers or on different couples of switchgear/contactors with different relative positions between the switchgear and the circuit breaker or contactor.

Thus, in a further aspect the present invention relates also to a tool kit for a switchgear comprising a switchgear tool and a supporting device as defined in the present disclosure. Preferably, in order to have a quick and reliable mounting, the tool comprises a fourth locking device, which is adapted to be coupled with the third locking device positioned on the second, supporting, plate of the supporting device.

In an exemplary embodiment of the tool kit for a switchgear according to the invention, said tool is a motorized drive for rack-in/rack-out operations in said switchgear.

In such a case, said motorized drive preferably comprises a motorized driver shaft, which is adapted to be inserted into an insertion hole in said switchgear front panel, and connected to a switchgear truck. According to this embodiment, said motorized driver shaft preferably comprising an extensible end for connection with said switchgear truck.

In such a way, it is possible to compensate for different operating distances between the motorized drive and the actual insertion point of the shaft end in the truck, thereby allowing the use of the tool on different kind of switchgears.

As better explained in the following detailed description, in a preferred embodiment of the tool kit for a switchgear of the present invention, the extensible shaft end comprises a substantially cylindrical element which is coaxially mounted on said driver shaft and operated by a setting handle positioned on the casing of the tool. Advantageously, the setting handle is provided with locking means for locking said extensible end at a selected insertion distance.

Further features and advantages of the present invention will be more clear from the description of preferred but not exclusive embodiments of a supporting device for switchgear tools, as well as of a tool kit for a switchgear, according to the invention, shown by way of examples in the accompanying drawings, wherein.

Figure 11:
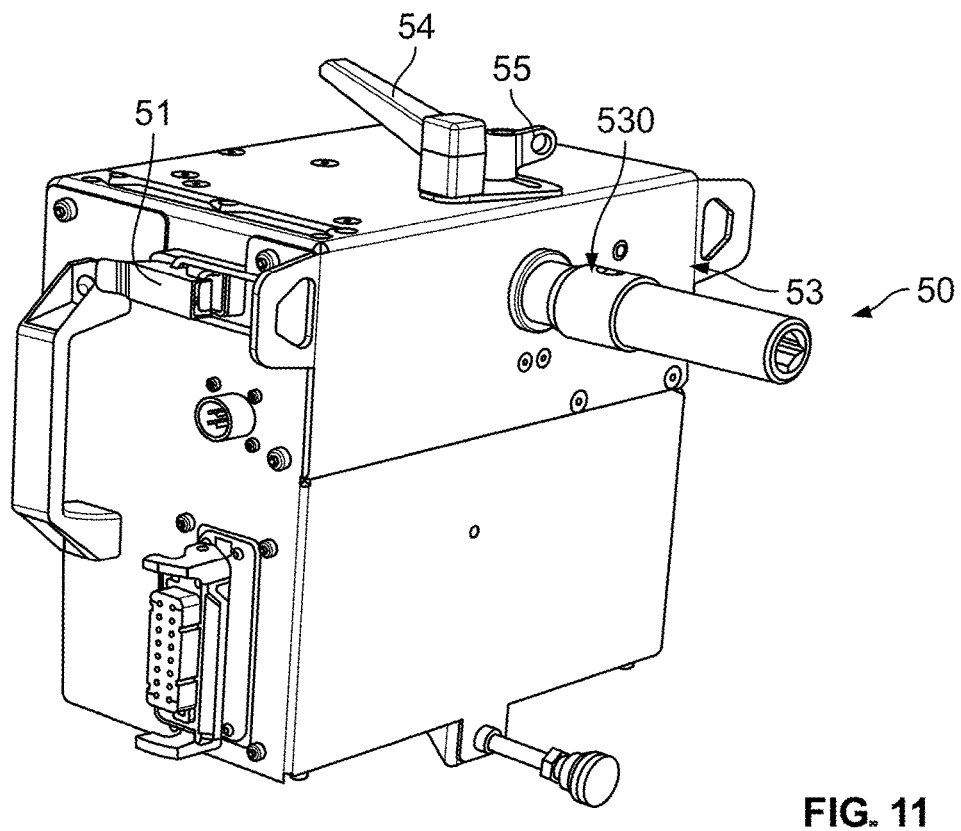
Figure 12:
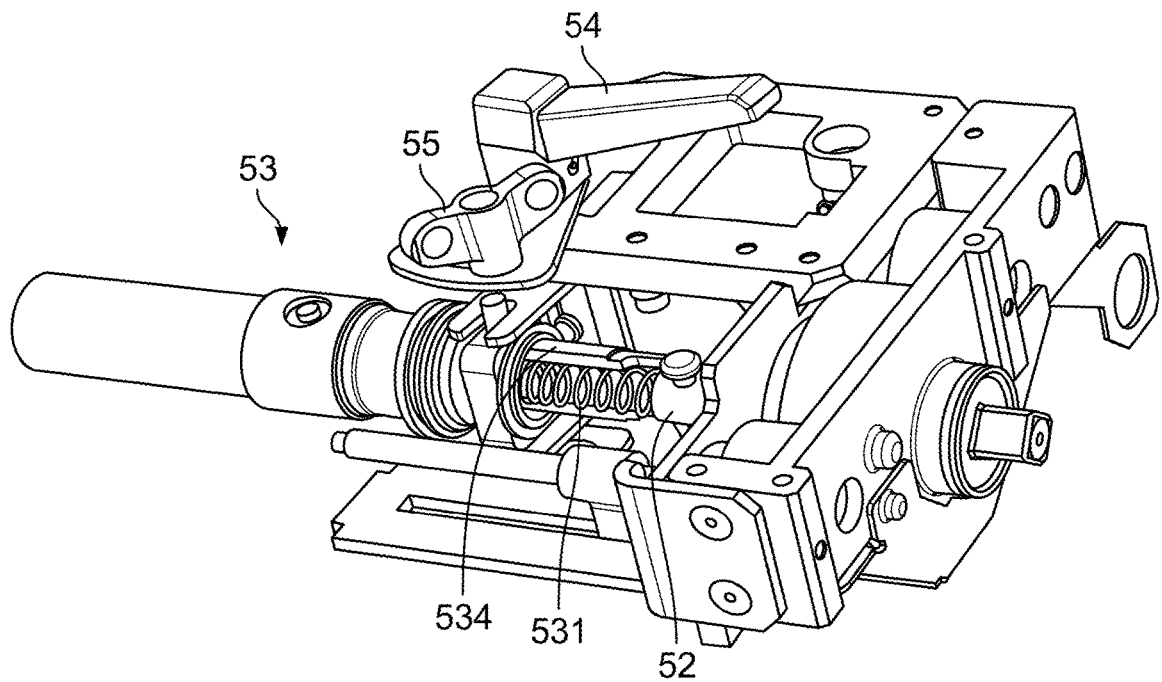
Figure 13:
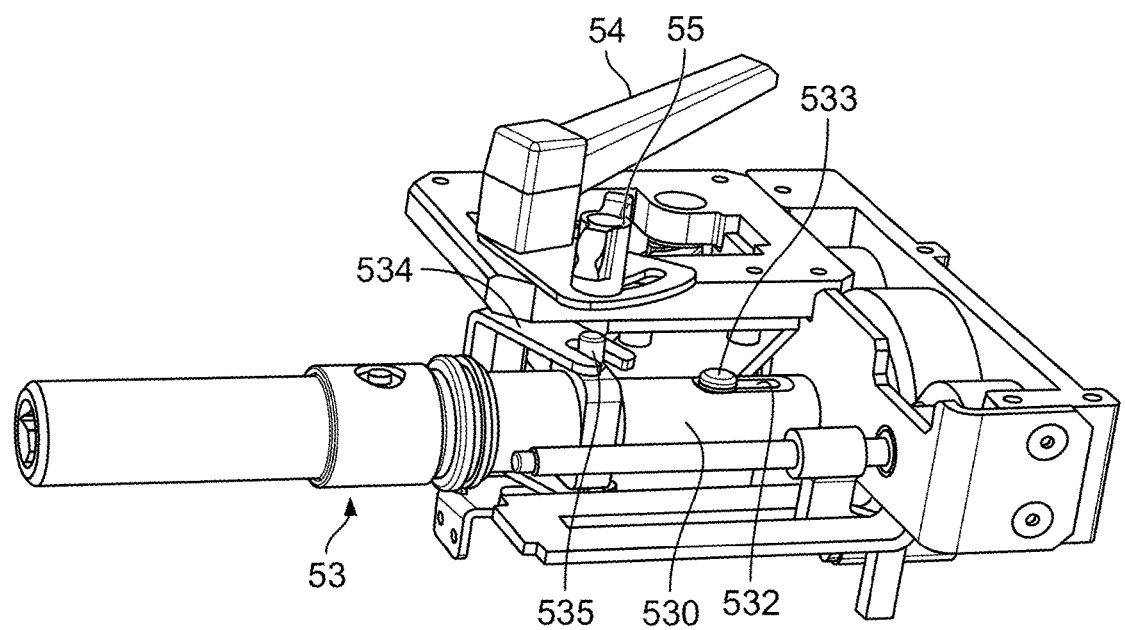
Figure 14:
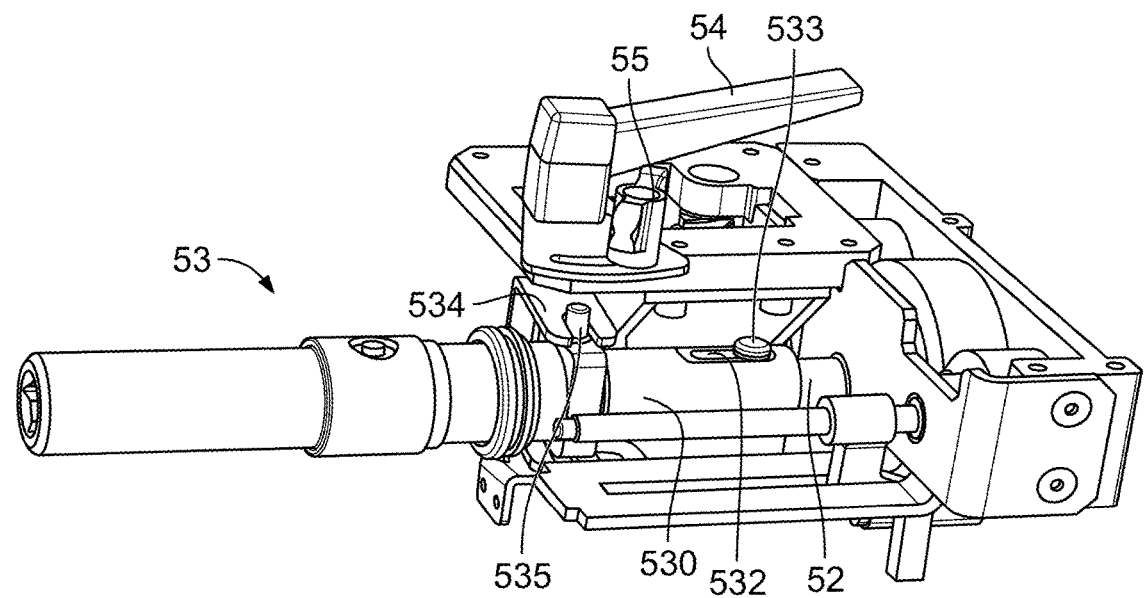
Figure 15:
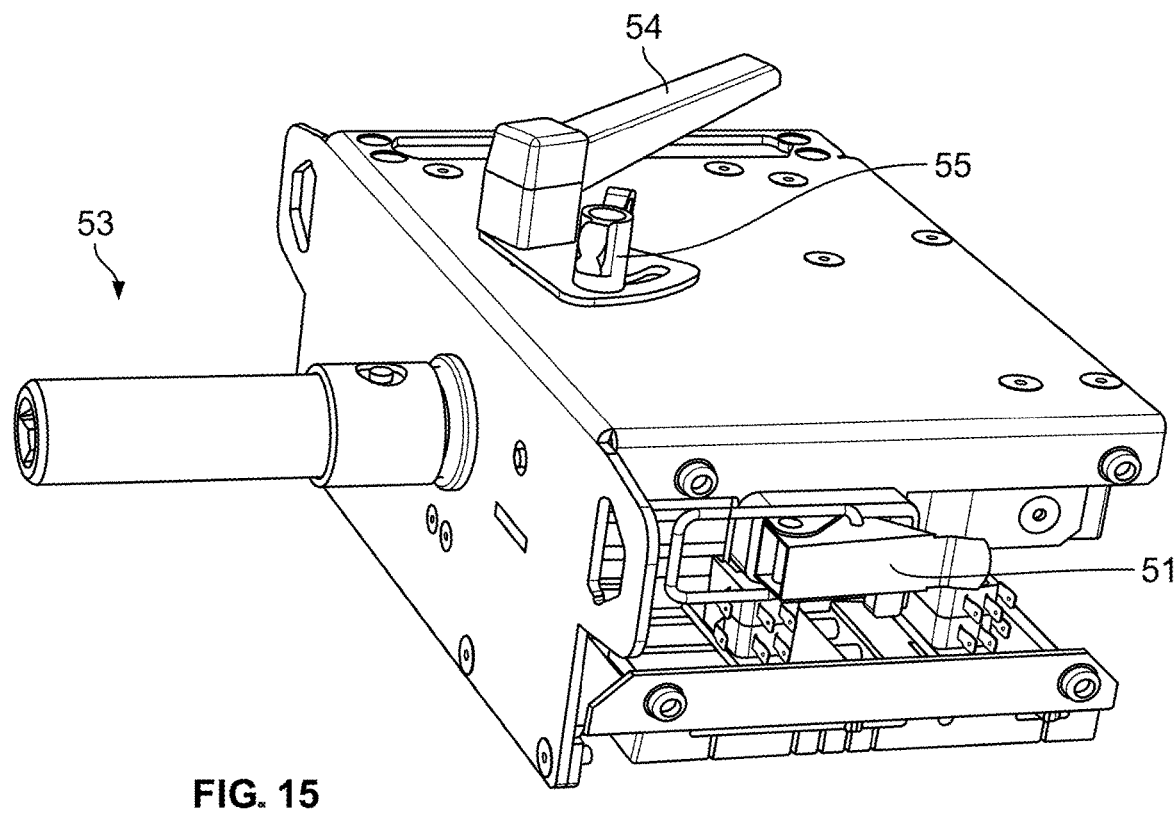
Figure 16:
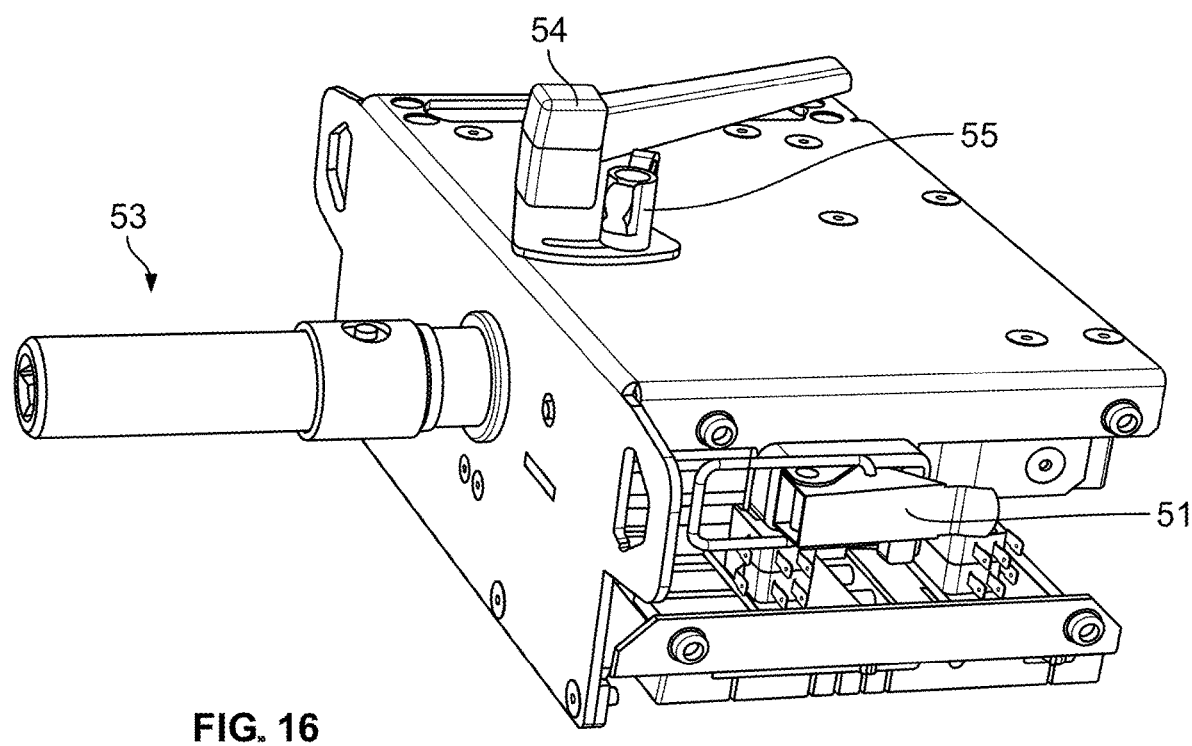

FIGS. 10*a*-10*e* show the operating sequence for installing a switchgear tool on a switchgear front panel using a supporting device according to the invention;

FIG. 11 is a perspective view of a switchgear tool in the form of a motorized drive for rack-in/rack-out operations in a switchgear, according to the invention;

FIG. 12 is a perspective view of a first detail of a motorized drive for rack-in/rack-out operations in a switchgear, according to the invention;

FIG. 13 is a perspective view of a second detail of a motorized drive for rack-in/rack-out operations in a switchgear, according to the invention, with a drive shaft extension in a first position;

FIG. 14 is a perspective view of a second detail of a motorized drive for rack-in/rack-out operations in a switchgear, according to the invention, with a drive shaft extension in a second position;

FIG. 15 is a perspective view of a third detail of a motorized drive for rack-in/rack-out operations in a switchgear, according to the invention, with a drive shaft extension in a first position;

FIG. 16 is a perspective view of a third detail of a motorized drive for rack-in/rack-out operations in a switchgear, according to the invention, with a drive shaft extension in a second position.

With reference to the attached figures—in its more general definition—the supporting device 1, 100 according to the present invention is generally used for mounting a tool 50 on the front panel 61 of a switchgear 60. In the following description, reference will be mainly made to a motorized drive 50 for rack-in/rack-out operations in a switchgear 60, as a tool to be supported by the supporting device 1, 100. However, the possibilities of using the supporting device 1, 100 are more general, and any generic tool that needs to be mounted on the front panel 61 of a switchgear 60 can be adapted to be supported by the supporting device 1, 100. With reference to FIGS. 1-6, in a first embodiment of the invention, the supporting device 1 comprises a first, fixing, plate 2 and a second, supporting, plate 3 which are connected to each other. The connection between the plates 2 and 3 is such that said plates 2, 3 are free to rotate with respect to each other in a first plane, i.e. the plane xy represented in FIG. 1. Once the device 2 is fixed on to the front panel 61 of a switchgear 60, the plane xy is substantially vertical and parallel to the front panel 61 of a switchgear 60.

The supporting device 1 further comprises a first locking device 4 for locking the first, fixing, plate 2 and the second, supporting, plate 3 at selected angular position with respect to each other.

In this way, once the supporting device 1 is fixed on the front panel 61 of a switchgear 60, by rotating the second, supporting, plate 3 with respect to the first, fixing, plate 2 it is possible to position said second, supporting, plate 3 in a substantially horizontal alignment. To this purpose, the supporting device 1 may be conveniently provided with an alignment system 950, such as a level, e.g. a spirit level, conveniently positioned on the second, supporting, plate 3 to determine the proper horizontal alignment of the device 1 and consequently of the tool 50 attached thereto. Once the desired angular position of the second, supporting, plate 3 is reached, it can be locked in said position by the first locking device 4.

In the embodiments of FIG. 1-6, the second, supporting, plate 3 comprises four arc-shaped slots 41 and the first, fixing, plate 2 comprises four corresponding threaded pins 42 which are inserted into said arc-shaped slots 41. In such a case, the first locking device 4 conveniently comprises screw devices, e.g. the locking screws 43 for locking each pin 41 into the corresponding arc-shaped slot 42 at the of selected angular position of the second, supporting, plate 3 with respect to the first, fixing, plate 2.

A different number of slots and pins, as well as different locking devices, can also be used depending on the needs. For instance, with reference to the embodiment of the supporting device 100 of FIGS. 7 and 8, the second, supporting, plate 300 comprises three arc-shaped slots 401 and the first, fixing, plate 200 comprises three corresponding threaded pins 402 which are inserted into the arc-shaped slots 401. In turn, the first locking device 400 conveniently comprises three locking screws 403 for locking each pin 401 into the corresponding arc-shaped slot 402 at the of selected angular position of the second, supporting, plate 300 with respect to the first, fixing, plate 200.

The supporting device 1, 100 according to the invention further comprises a magnetic fixing device that comprises one or more fixing magnets 70, which are adapted to be fixed on the front panel 61 of the switchgear 60. The number, dimension, and features of the fixing magnet 70 can be selected according to the needs. For instance, in the embodiments of FIGS. 1-6 four fixing magnets 70 are used, whereas in the embodiment of figure 1and 8 three fixing magnets 70 are used.

Figure 1:
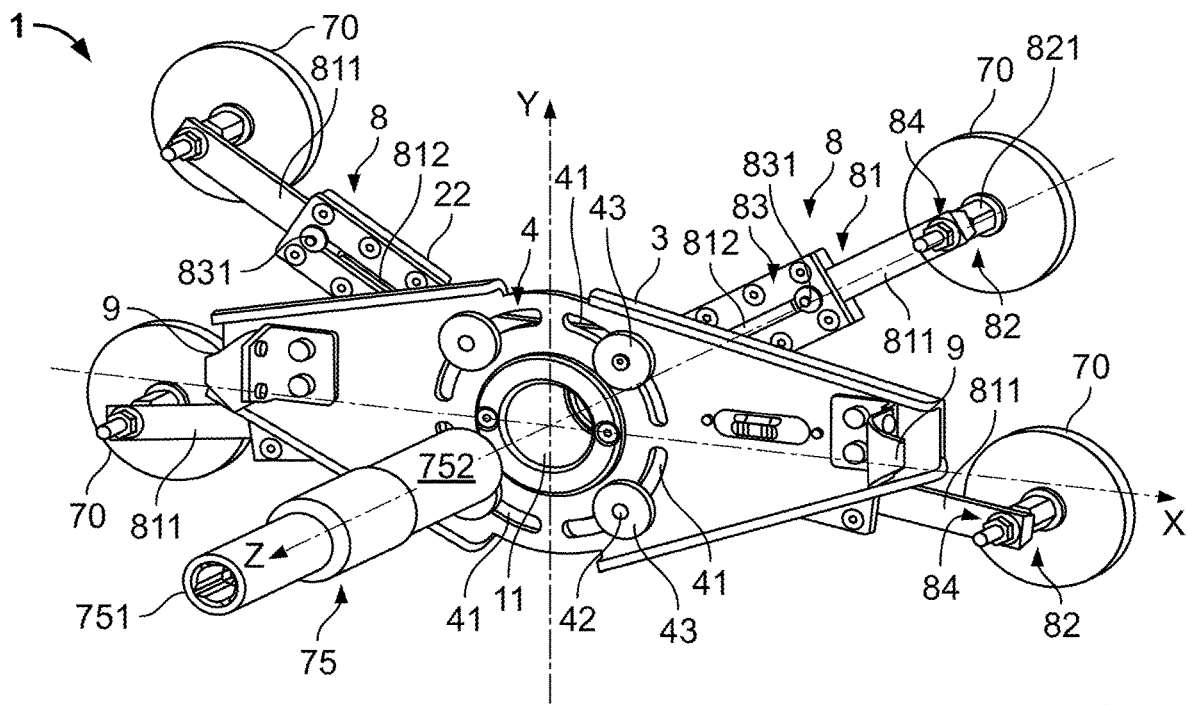
FIG. 1 is a first perspective view of a first embodiment of a supporting device for switchgear tools according to the invention.
Figure 2:
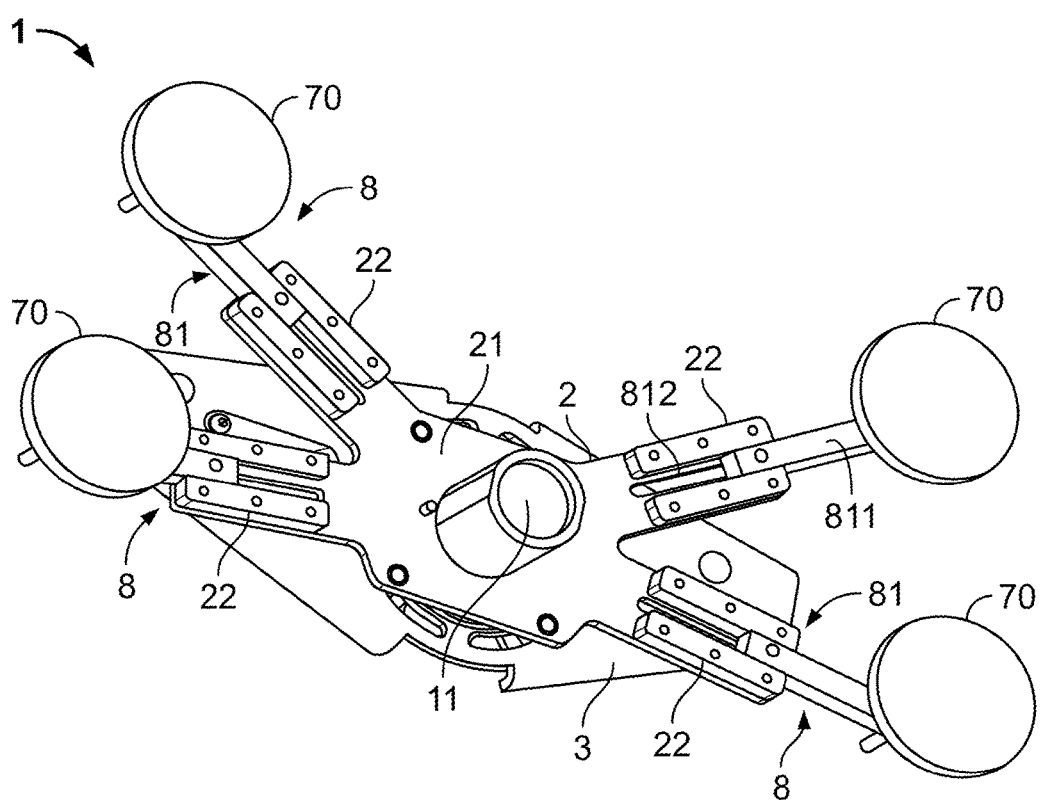
FIG. 2 is a second perspective view of a first embodiment of a supporting device for switchgear tools according to the invention.

The fixing magnets 70 are attached to the first, fixing, plate 2, 200 by using an adjustable connection device 8 that allows positioning the fixing magnets 70 at different positions with respect to said first, fixing, plate 2, 200. As better explained hereinafter, the adjustable connection device 8 allows adjusting the position of the fixing magnets with respect to the first, fixing, plate 2, 200 both in a xy plane and in a z direction, as represented in FIG. 1.

A second locking device is then present for locking said fixing magnets 70 at different positions (in the xy plane and along the z direction) with respect to said first, fixing, plate 2, 200. It is worth noting that the position of each fixing magnet 70 can be selected and set independently from each other, i.e. each fixing magnet 70 can be moved and positioned independently from the other, both in the xy plane and along the z direction.

In the various embodiments, the supporting device 1, 100 according to the invention further comprises a third locking device 9, 900 for fixing a tool 50 on said second, supporting, plate 3, 300. Any suitable fixing means can be used to this purpose, e.g., pin means, hooking means, clipping means, fastening means, as well as any equivalent means.

As shown in the attached figures, in the operative position of the supporting device 1, 100 according to the invention, said third locking device 9, 900 and said fixing magnets 70 are positioned on opposite sides of said supporting device 1, 100. In practice, the fixing magnets are positioned on the side of the supporting device 1, 100 facing the front panel 61 of the switchgear 60 so as to allow the positioning of the fixing magnets 70 on the front panel 61, whereas the third locking device 9, 900 are positioned on the opposite side so as to allow the positioning and locking of the tool 50 on the supporting device 1, 100.

In most cases, the tool 50 to be positioned on the front panel 61 of the switchgear 60 may comprise an actuating shaft that has to be inserted in a corresponding opening in the front panel 61. In particular, this is the case when the tool 50 is a motorized drive for performing the rack-in/rack-out operations in the switchgear 60.

The supporting device 1, 100 according to the invention is therefore preferably provided with a first substantially circular through hole 11, 110. In such a case, the first, fixing, plate 2, 200 and the second, supporting, plate 3, 300 are coaxially mounted around said first substantially circular through hole 11, 110.

In largely preferred embodiments of the supporting device 1, 100 of the present invention, the adjustable connection device 8 comprises first adjustable connection elements 81, which are connected to the first, fixing, plate 2, 200 and free to slide in the xy plane. Furthermore, the adjustable connection device 8 advantageously comprises second adjustable connection elements 82, each connecting a fixing magnet 70 to a corresponding first adjustable connection element 81 at adjustable distances along a z direction, which is perpendicular, the xy plane.

Thus, in this way, the first adjustable connection elements 81 allow positioning the fixing magnets 70 at suitable location on the front panel 61 of the switchgear 60, while the second adjustable connection elements 82 allow maintaining the supporting device 1, 100 in a vertical plane at a proper distance from the front panel 61 of the switchgear 60.

To this purpose, the second locking device comprises first locking elements 83 for locking said the adjustable connection elements 81 at the selected position of the front panel 61 with respect to said first, fixing, plate 2, 200; the second locking device also comprises second locking elements 84 for locking the fixing magnets 70 at the desired distance with respect to said corresponding first adjustable connection element 81, and consequently with respect to the first, fixing, plate 2, 200 which is therefore kept in a substantially vertical position and parallel to the front panel 61 of the switchgear 60.

As represented in the attached figure, the first adjustable connection elements 81 may conveniently comprise a plurality of sliding bars 811. A first end of said sliding bars 811 is inserted is a corresponding slot or groove 812 which is formed on said first, fixing, plate 2, 200 so that a sliding connection between said sliding bars 811 and the first, fixing, plate 2, 200 is realized.

In order to lock the sliding bars 811 at selected positions into said slots 812, the first locking elements 83 preferably comprise first screw devices 831, for examples screw means 831, which can be screwed in a corresponding threaded hole in the sliding bars 811 to lock them once the desired position has been set.

Figure 5:
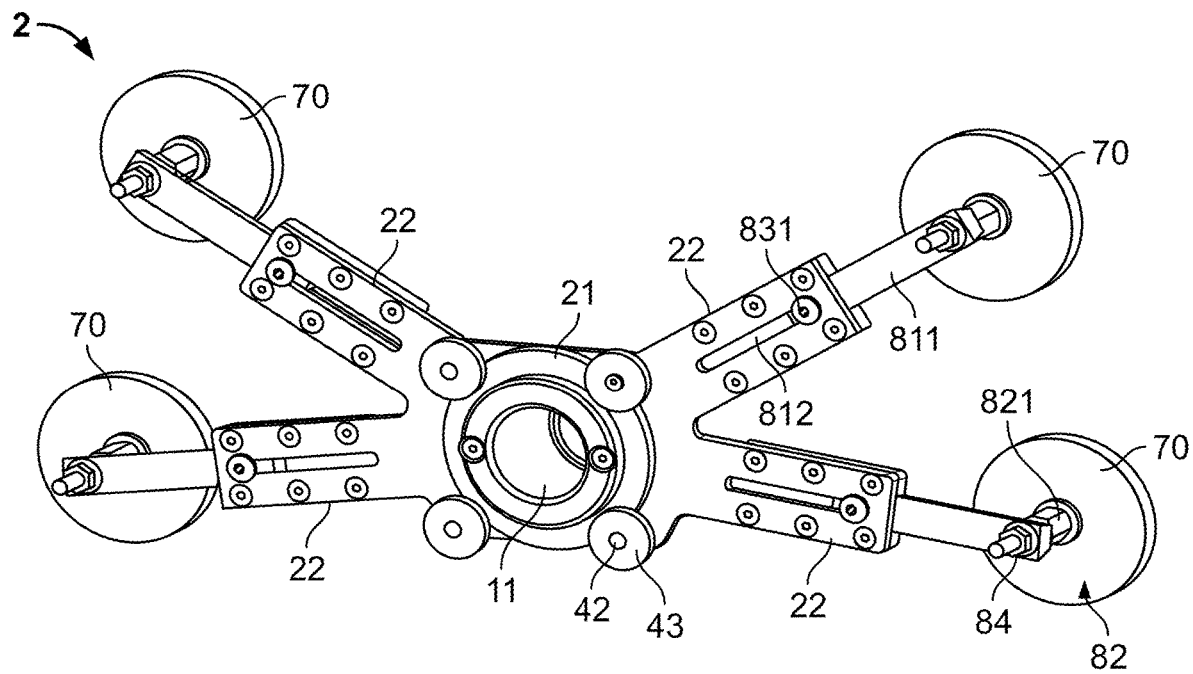
FIG. 5 is a perspective view of a first embodiment of component of a supporting device for switchgear tools according to the invention, in a first position.
Figure 6:
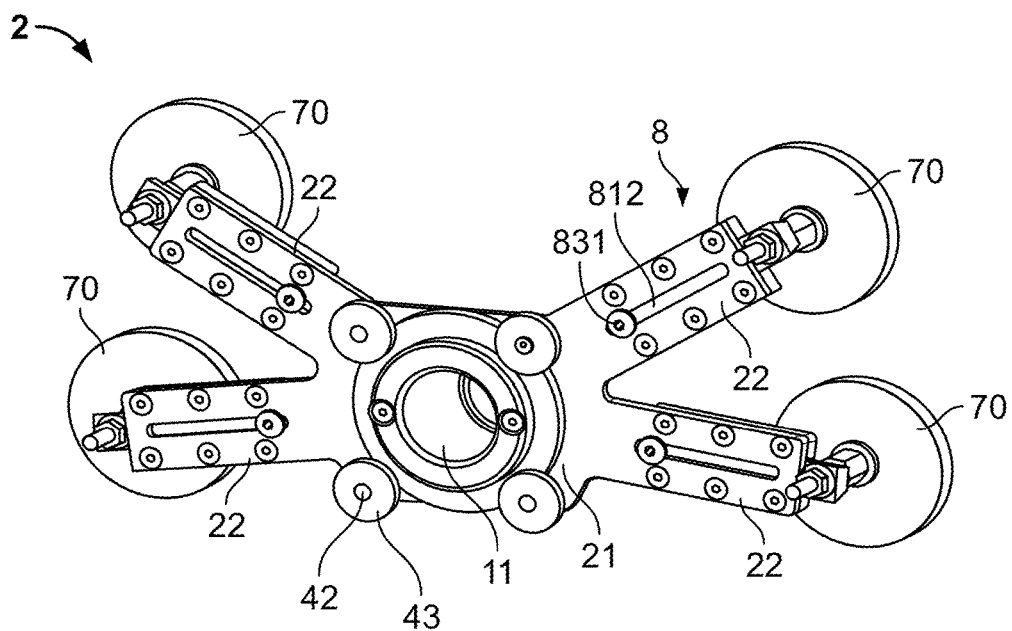
FIG. 6 is a perspective view of a first embodiment of component of a supporting device for switchgear tools according to the invention, in a second position.
Figure 7:
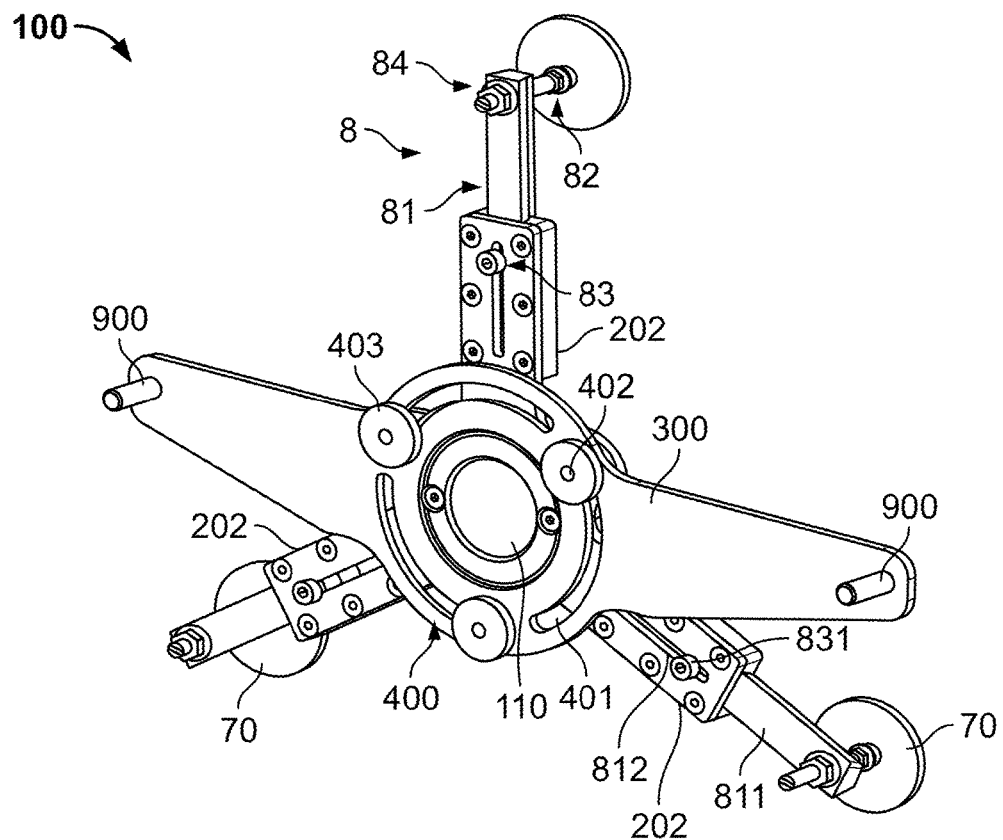
FIG. 7 is a first perspective view of a fourth embodiment of a supporting device for switchgear tools according to the invention.
Figure 8:
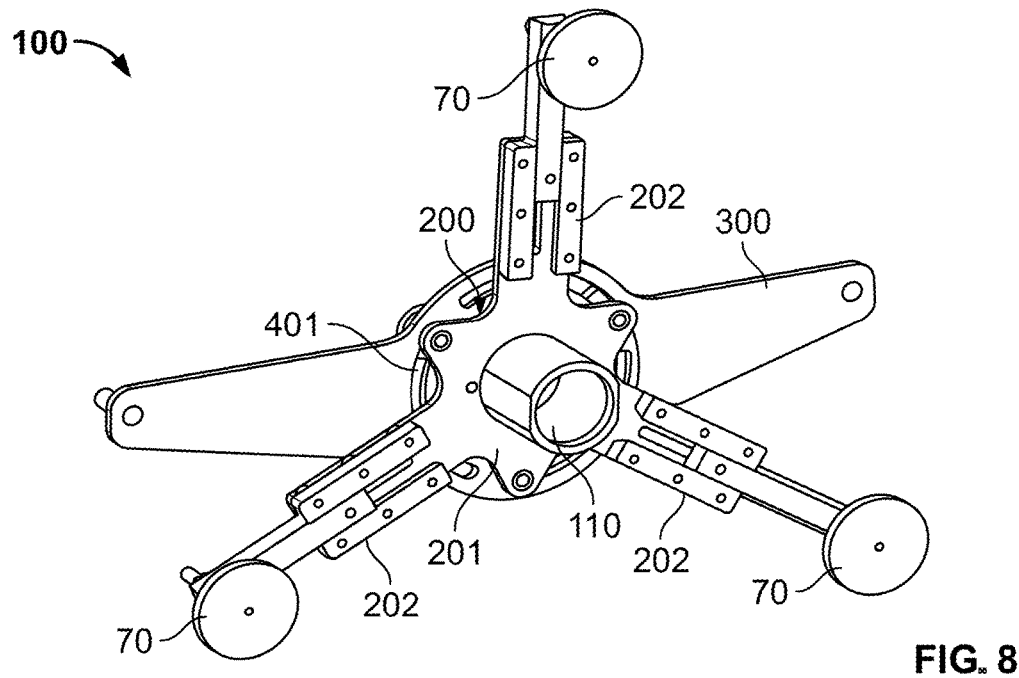
FIG. 8 is a second perspective view of a fourth embodiment of a supporting device for switchgear tools according to the invention.
Figure 9:
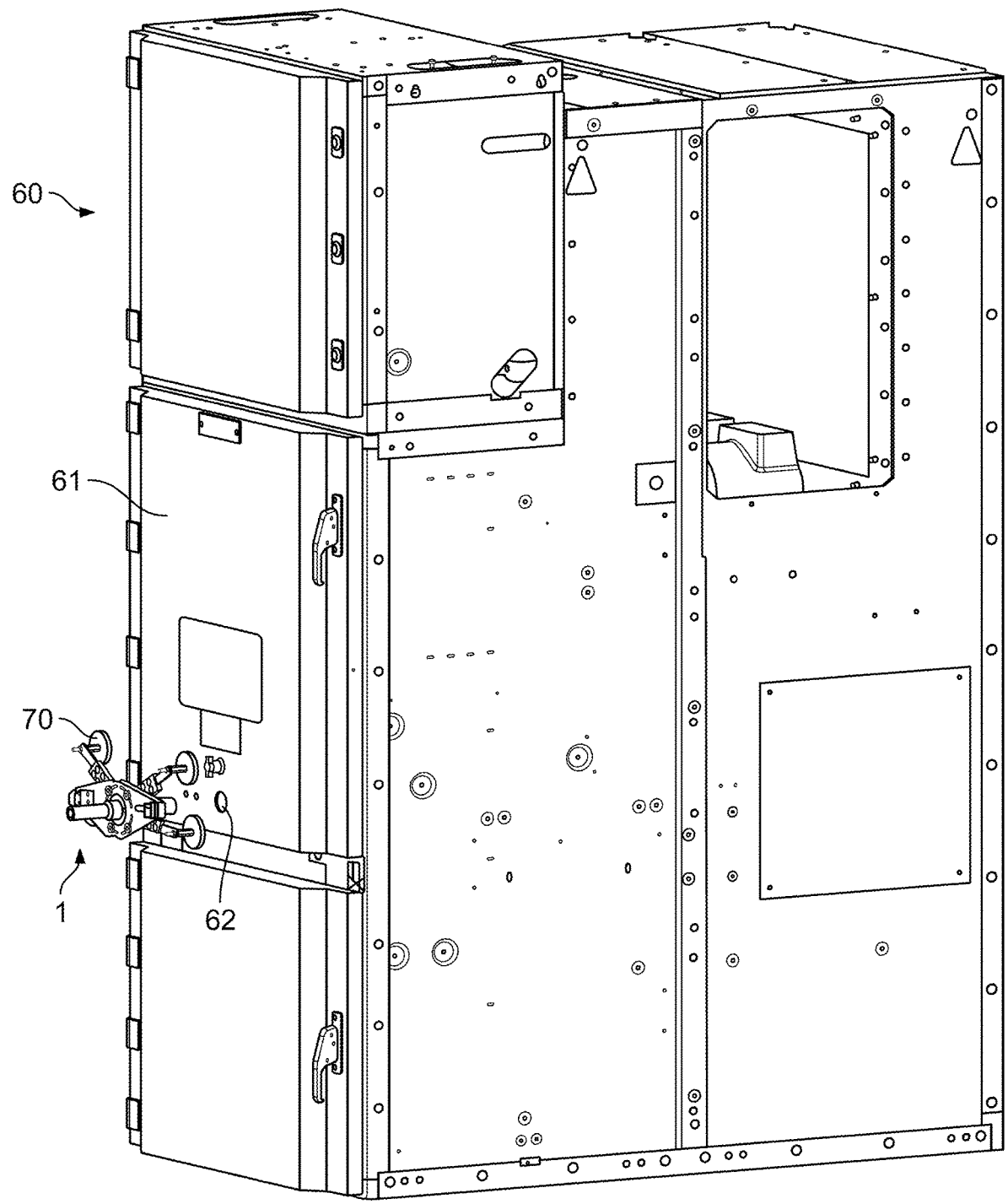
FIG. 9 is a perspective view of a medium voltage switchgear and a supporting device for switchgear tools according to the invention.

Thus, as shown in FIGS. 5 and 6, the sliding bars 811 can be moved and locked at different positions with respect with respect to the first, fixing, plate 2 (and, similarly, with respect to the first, fixing, plate 200 in the embodiment of FIGS. 7 and 8). In the positions shown in FIGS. 5 and 6, the sliding bars 811 are symmetrically positioned with respect to the first, fixing, plate 2. Since they are movable independently form each other, any other configuration—i.e. positioning of the sliding bars 811 with respect to the first, fixing, plate 2—is possible, depending on the needs.

The second end of said sliding bars 811 is connected to a corresponding fixing magnet 70 through said second adjustable connection elements 82. In the embodiments shown in the attached figures, the second adjustable connection elements 82 preferably comprise second screw devices 821, which have a first end threaded into the sliding bars 811. In the operative position, the second end of the second screw devices 821 protrude from said the sliding bars 811 along the z direction and toward the front panel 61 of the switchgear 60. The fixing magnets 70 are conveniently positioned on said second end of the second screw devices 821.

In the embodiments of the supporting device 1 shown in FIGS. 1-6, the first, fixing, plate 2 comprises a central body 21 which is formed around said first substantially circular through hole 11. Four legs 22 extend form said central body 21, and the adjustable connection device 8 are conveniently positioned in correspondence of said legs 22.

As an alternative example, in the embodiment of the supporting device 100 shown in FIGS. 7 and 8, the first, fixing, plate 200 comprises a central body 201 which is formed around the first substantially circular through hole 110. Three legs 202 extend form said central body 201, and three adjustable connection device 8 are conveniently positioned in correspondence of said legs 202.

In general, the number of legs protruding from the central body of the first, fixing, plate may vary, depending on the needs.

In a particularly preferred embodiment of the invention, the supporting device 1, 100 further comprises a centering device 75 adapted to align said supporting device 1, 100 with a tool insertion hole 62 in the front panel 61 of the switchgear 60.

For instance, the centering device 75 has a substantially cylindrical body which is adapted to be inserted into the substantially circular through hole 11, 110 of the supporting device 1, 100 and has at least one end adapted to be coupled with a receiving part of the switchgear 60 inside the insertion hole 62.

Figure 3:
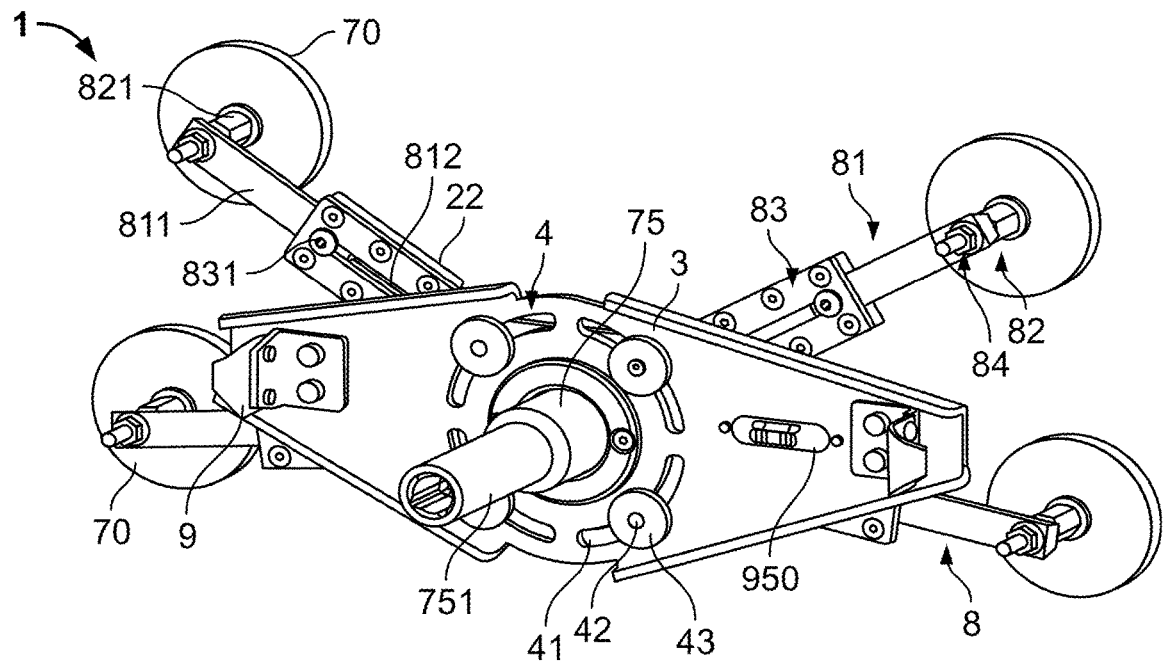
FIG. 3 is a perspective view of a second embodiment of a supporting device for switchgear tools according to the invention.
Figure 4:
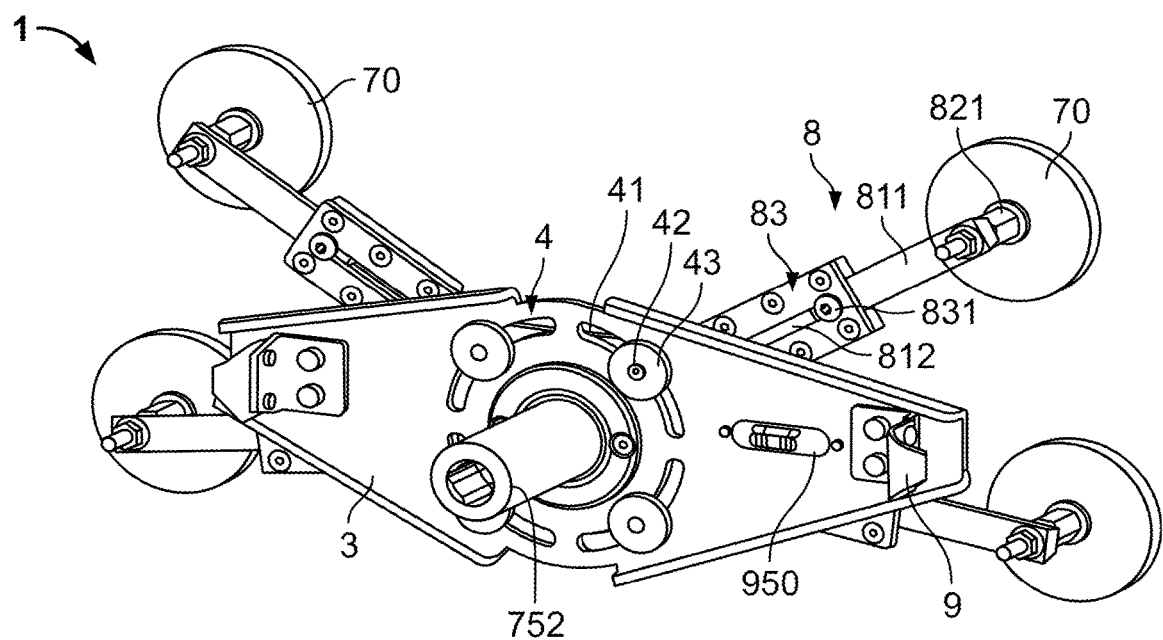
FIG. 4 is a perspective view of a third embodiment of a supporting device for switchgear tools according to the invention.

Conveniently—in order to increase the flexibility of use and the adaptability of the supporting device 1, 100 at different situation—the centering device 75 is provided with a first end 751 having first coupling means with a first shape and/or size for coupling with corresponding first receiving means of the switchgear 60, and with a second end 752 having second coupling means with a second shape and/or size for coupling with corresponding second receiving means of the switchgear 60. Thus, as shown in FIGS. 3 and 4, the centering device 75 can be inserted into the supporting device 1, 100 in such a way that either the first end 751 or the second end 752 protrudes toward the front panel 61 of the switchgear 60 for a proper coupling with the corresponding receiving means of the switchgear 60.

The operative sequence for fixing the supporting device 1, 100 on the front panel 61 of a switchgear 60 is shown in the attached FIGS. 9 and 10a-10e.

Figure 10A:
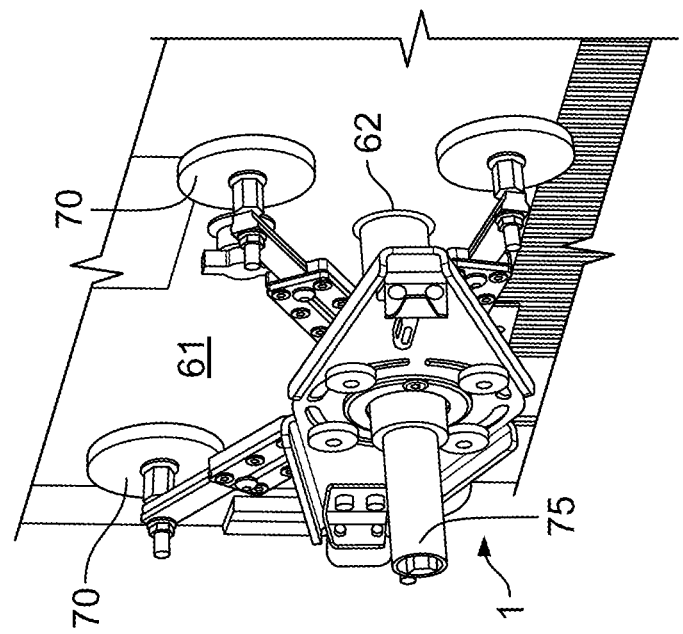

Starting form FIG. 10a, the centering device 75 is inserted into the circular through hole 11 of the supporting device 1 and the whole assembly is approaching the front panel 61 of the switchgear 60.

Figure 10B:
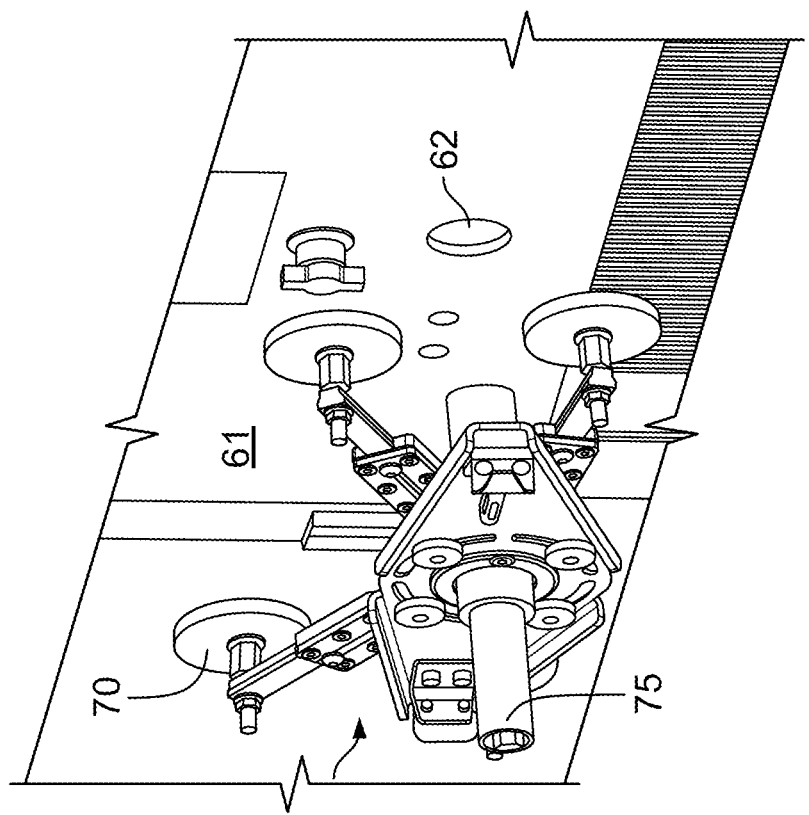

In FIG. 10b, the centering device 75 is inserted into the tool insertion hole 62 in the front panel 61 so as to keep the proper alignment of the supporting device 1 with the tool insertion hole 62. At this point, the distance of the fixing magnets 70 from the first, fixing, plate 2 can be adjusted so as to allow their positioning at proper location on the front panel of the switchgear. This can be done by adjusting the distance of the sliding bars 811 with respect to the first, fixing, plate 2 as previously explained.

Figure 10D:
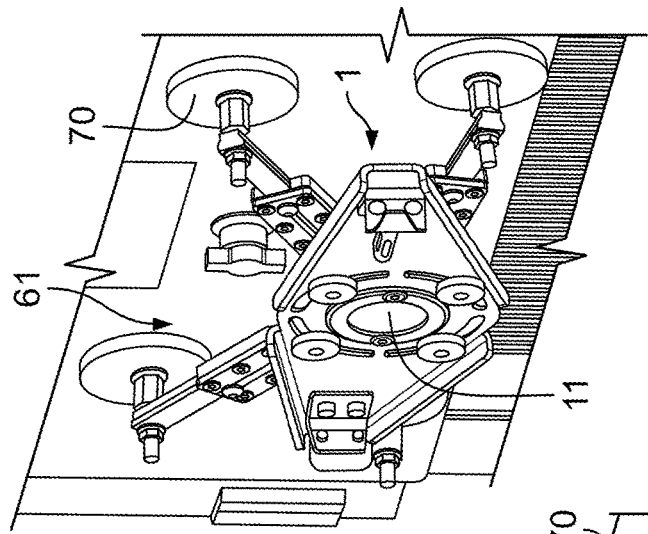
Figure 10E:
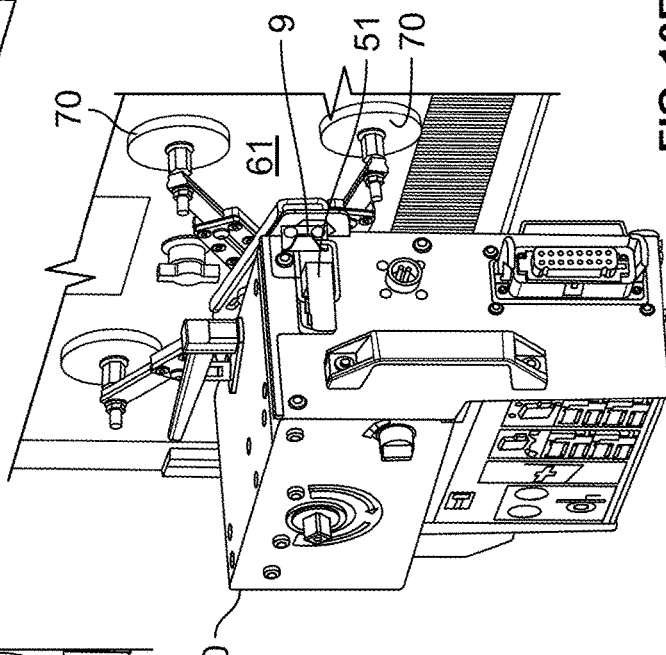
Figure 10C:
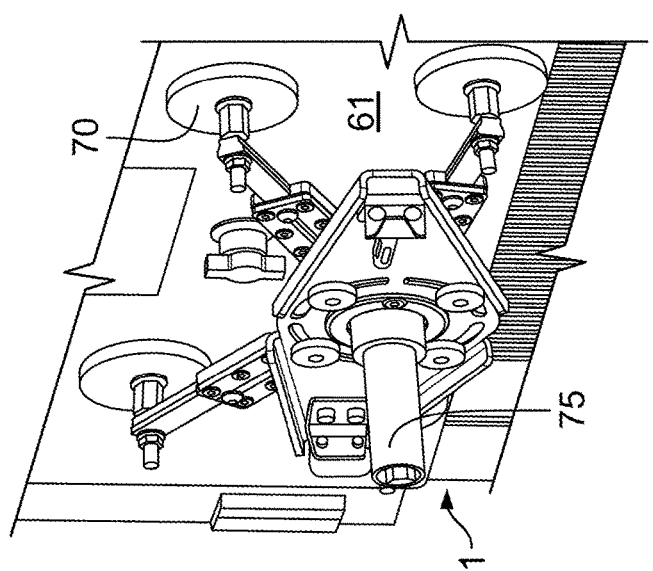

In FIG. 10c, the fixing magnets 70 are in contact with the front panel 61 and the supporting device is securely fixed on said front panel. If necessary, the distance of the supporting device 1 form the front panel 61 and its vertical alignment can be adjusted—before or after mounting it on the front panel—by regulating the screw devices 821 as previously explained. The centering device 75 can therefore be removed from the supporting device 1 as shown in FIG. 10d. Further adjustments of the position of the supporting device 1 can be made at this point by regulating the position of the sliding bars 811 and/or of the screw devices 821. Moreover, the proper horizontal alignment of the second, supporting, plate 3 can be achieved by rotating it with respect to the first, supporting, plate 2 and fixing it in the correct horizontal position using the locking device 4 as previously explained. Such operation can be carried out using an alignment system 950 to check the proper horizontal alignment of the supporting device 1.

Finally, as shown in FIG. 10e, a tool 50 can be attached to the supporting device 1 and secured to it by using the third locking device 9 (e.g. hooking means) on the supporting device 1 and a corresponding fourth locking device 51 (e.g. clipping means) on the tool 50.

In a further aspect, the present invention also relate to a tool kit for a switchgear 60 which comprises a generic switchgear tool 50 and a supporting device 1, 100 as previously described.

With reference to FIGS. 11-16, the tool 50 can be a motorized drive for rack-in/rack-out operations in said switchgear 60, which is provided with a fourth locking device 51 adapted to be coupled with the third locking device 9, 900 positioned on the second, supporting, plate 3 of the supporting device 1.

The motorized drive 50 generally comprises a motorized driver shaft 52 which is adapted to be inserted into an insertion hole 62 in the front panel 61 of the switchgear 60 and connected to a switchgear truck for carrying out rack-in/rack-out operations of a circuit breaker or contactor in said switchgear 60.

In order to compensate for different relative positions between said contactor or circuit breaker and the front panel 61 of the switchgear 60 (i.e. different operating distances) and increase its adaptability and flexibility of use, the driver shaft 52 of the motorized drive 50 preferably comprises an extensible and interchangeable end 53 for connection with said switchgear truck according to different possible operating distances or shapes.

In other words, the driver shaft 52 does not have a fixed length, but a variable length according to the operating needs.

According to a preferred embodiment of the tool kit of the present invention, the extensible end 53 of the driver shaft 52 comprises a substantially cylindrical element 530 which is coaxially mounted on said driver shaft 52 and operatively connect to it so as to be rotated together with the driver shaft 52.

Such connection can be made, for instance, by providing the cylindrical element 530 of extensible end 53 of the driver shaft 52 with a slot 532 into which is inserted a pin 533 secured on the driver shaft 52. In such a way, the cylindrical element 530 can move longitudinally with respect to the driver shaft 52 for a distance corresponding to the length of the slot 532. At the same time, the rotation motion of the driver shaft 52 is transmitted to the cylindrical element 530 by the action of the pin 533 on the lateral walls of the slot 532.

A spring 531 is coaxially mounted inside the cylindrical element 530 and is operatively connected to the cylindrical element 530 and to the head of the driver shaft 520. A pin 535 is suitably positioned on the cylindrical element 530 and is operatively connected to an actuating fork 534.

In turn, the actuating fork 534 is operatively connected to a setting handle 54 positioned on the casing of the motorized drive 50. The operating handle is provided with locking means 55 for locking the extensible end 53 of the driver shaft 52 at a selected insertion distance. As an example, the locking means 55 can be screw means inserted in a slot provided in a plate firmly connected to the setting handle 54.

The above system described system allows adapting the extensible end 53 of the driver shaft 52 to different operating distances with respect to the truck in the switchgear 60. In practice, as shown in FIGS. 15 and 16, by rotating the setting handle 54, it is possible to vary the length of the portion of operating shaft extending outside the casing of the motorized drive 50. Once the desired length of such portion of operating shaft is reached, it is possible to lock the system in the desired position using the locking device 52.

It is clear from the above description that the supporting device for a tool and the tool kit for a switchgear of the present disclosure fully achieve the intended aims.

Indeed, the presently disclosed supporting device can be fitted to any switchgear without requiring modification on it. Thanks to the adjustable connection devices and the possibility of locking the fixing plate and the supporting plate at different angular position with respect to each other, it is possible to adapt the connection device of the present disclosure to substantially any layout of the front panel of a switchgear.

Moreover, the operation for fixing it on the front panel of the switchgear is very simple and does not require the use of any particular working tool. Once the supporting device is positioned on the front panel of the switchgear, the desired tool can be mounted on the support and connected to the switchgear. The tool then can be preferably operated from remote, thereby avoiding any risk for the operator during the operation of the tool. However, the possibility of a local mode operation can be also foreseen.

The flexibility of use and the adaptability of the supporting device of the present disclosure at different situation can be further increased by providing the centering device with at least two different coupling means at its ends, so that it can match with at least two different receiving means of the switchgear.

Moreover, in the tool kit according to the present disclosure, can operate on different couples of switchgear/circuit breakers or on different couples of switchgear/contactors with different relative positions between the switchgear and the circuit breaker or contactor, thanks to the presence of the extensible and interchangeable end of the driver shaft, thereby further increasing the flexibility of use and the adaptability of the tool kit at different situation (i.e., different kind of switchgears).

Several variations can be made to the supporting device for a tool and to the tool kit for a switchgear thus conceived, all falling within the scope of the attached claims. In practice, the materials used and the contingent dimensions and shapes can be any, according to requirements and to the state of the art.

The invention claimed is:

1. A supporting device for mounting tools on a switchgear front panel the support device comprises:
    a first, fixing, plate and a second, supporting, plate connected to each other and free to rotate with respect to each other in a first plane;
    a first locking device for locking said first, fixing, plate and said second, supporting, plate at selected angular position with respect to each other;
    a magnetic fixing device comprising fixing magnets adapted to be fixed on said switchgear front panel;
    an adjustable connection device connecting said fixing magnets to said first, fixing, plate and comprising a second locking device for locking said fixing magnets at different positions with respect to said first, fixing, plate; and
    a third locking device for fixing a tool on said second, supporting, plate;
    wherein said adjustable connection device comprises first adjustable connection elements connected to said first, fixing, plate and free to slide in said first plane and second adjustable connection elements connecting said fixing magnets to a corresponding first adjustable connection element at adjustable distances along a first direction perpendicular to said first plane, said second locking device comprising first locking elements for locking said first adjustable connection elements at adjustable distances with respect to said first, fixing, plate and said second locking elements for locking said fixing magnets at adjustable distances with respect to said corresponding first adjustable connection element;
    wherein said first adjustable connection elements comprise a plurality of sliding bars, a first end thereof being slidingly connected to said first, fixing, plate and a second end thereof being connected to a corresponding fixing magnet through said second adjustable connection elements.

2. The supporting device according to claim 1, which further comprises a first substantially circular through hole, said first, fixing, plate and said second, supporting, plate being coaxially mounted around said first substantially circular through hole.

3. The supporting device according to claim 1, wherein each of said plurality of sliding bars slide in a corresponding plurality of slots in said first, fixing, plate, and in that said first locking elements comprise first screw devices for locking said sliding bars at selected positions into said slots.

4. The supporting device according to claim 1, wherein said second adjustable connection elements comprise second screw devices having a first end threaded into said first adjustable connection elements and extending from said first adjustable connection elements perpendicularly to said first plane, said fixing magnets being positioned on a second end of said second screw devices.

5. The supporting device according to claim 1, wherein said first, fixing, plate comprises a central body formed around said first substantially circular through hole and a plurality of legs extending from said central body, said adjustable connection device being positioned in correspondence of said legs.

6. The supporting device according to claim 1, wherein said second, supporting, plate comprises one or more arc-shaped slots and said first, fixing, plate comprises one or more pins inserted into said arc-shaped slots, said first locking device comprising third screw devices for locking said pins into said arc-shaped slots at selected angular position.

7. The supporting device according to claim 1, wherein said third locking device and said fixing magnets are positioned on opposite sides of said supporting device.

8. The supporting device according to claim 1, which further comprises a centering device adapted to align said supporting device with a tool insertion hole in said switchgear front panel.

9. A tool kit for a switchgear comprising a switchgear tool and a supporting device according to claim 1.

10. The tool kit for the switchgear according to claim 9, wherein said tool comprises a fourth locking device adapted to be coupled with said third locking device.

11. The tool kit for the switchgear according to claim 10, wherein said tool is a motorized drive for rack-in/rack-out operations in said switchgear.

12. The tool kit for the switchgear according to claim 11, wherein said motorized drive comprises a motorized driver shaft adapted to be inserted into an insertion hole in said switchgear front panel and connected to a switchgear truck, said motorized driver shaft comprising an extensible end for connection with said switchgear truck.

13. The tool kit for the switchgear according to claim 12, wherein said extensible end comprises a substantially cylindrical element coaxially mounted on said driver shaft and operated by a setting handle having a locking device for locking said extensible end at a selected insertion distance.

14. The tool kit for the switchgear according to claim 9, wherein each of said plurality of sliding bars slide in a corresponding plurality of slots in said first, fixing, plate, and in that said first locking elements comprise first screw devices for locking said sliding bars at selected positions into said slots.

15. The tool kit for the switchgear according to claim 9, wherein said second adjustable connection elements comprise second screw devices having a first end threaded into said first adjustable connection elements and extending from said first adjustable connection elements perpendicularly to said first plane, said fixing magnets being positioned on a second end of said second screw devices.

16. The tool kit for the switchgear according to claim 9, wherein said second adjustable connection elements comprise second screw devices having a first end threaded into said first adjustable connection elements and extending from said first adjustable connection elements perpendicularly to said first plane, said fixing magnets being positioned on a second end of said second screw devices.

* * * * *